(12) United States Patent
Polehn et al.

(10) Patent No.: US 11,876,587 B1
(45) Date of Patent: Jan. 16, 2024

(54) SYSTEMS AND METHODS FOR SWITCHED ANTENNA ARRAY CONFIGURATION

(71) Applicant: VERIZON PATENT AND LICENSING INC., Basking Ridge, NJ (US)

(72) Inventors: Donna L. Polehn, Mercer Island, WA (US); Corey J. Christopherson, Bainbridge Island, WA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/817,744

(22) Filed: Aug. 5, 2022

(51) Int. Cl.
*H04B 7/02* (2018.01)
*H04B 7/06* (2006.01)
*H04B 7/0456* (2017.01)

(52) U.S. Cl.
CPC ......... *H04B 7/0608* (2013.01); *H04B 7/0456* (2013.01)

(58) Field of Classification Search
CPC .......................... H04B 7/0608; H04B 7/0456
USPC ............... 375/267, 260, 259, 219, 295, 316
See application file for complete search history.

(56) References Cited

U.S. PATENT DOCUMENTS

2015/0110049 A1* 4/2015 Pabla .................. H04B 7/0617
370/329

OTHER PUBLICATIONS

Awl et al., "Bandwidth Improvement in Bow-Tie Microstrip Antennas: The Effect of Substrate Type and Design Dimensions," Applied Sciences, 10, 504, 14 pages (2020).
Olabisi et al., "Bow-Tie Microstrip Patch Antenna—Design and Implementation for Dual Band WLAN Applications," International Journal of Trend in Scientific Research and Development, vol. 3, issue 4, pp. 1136-1140 (2019).
Alam et al., "Enhancement bandwidth of triangular microstrip antenna using peripheral slit technique fed by coplanar waveguide for mobile communication," International Conference on Computing, Engineering and Design (ICCED), 16 pages (2017).
Liu et al., "Next generation backscatter communication: systems, techniques, and applications," EURASIP Journal on Wireless Communications and Networking, 11 pages (2019).
Hoang, Alexander T., "Ultra low-voltage low power backscatter communication and energy harvesting for long-range battery-free sensor tags," A dissertation submitted in partial fulfillment of the requirements for the degree of Doctor of Philosophy University of Washington, 108 pages (2019).
Fara et al., "Reconfigurable Intelligent Surface-Assisted Ambient Backscatter Communications—Experimental Assessment," IEEE International Conference on Communications Workshops (2021).

(Continued)

*Primary Examiner* — Zewdu A Kassa (57) ABSTRACT

In the various embodiments, a radio communication system implementing an Switched Antenna Array (SAA) is provided that minimizes the number of radio chains required for a given number of antennas by implementing a radio frequency (RF) switch that connects the radio chains to the antennas. In some embodiments, the RF switch can activate a subset of antennas in the antenna array to generate an appropriate beam pattern for communications with another device. In some embodiments, a method is provided to determine a configuration matrix corresponding to a beam pattern with a desired signal conformity level.

20 Claims, 8 Drawing Sheets

(56) References Cited

OTHER PUBLICATIONS

Kellogg et al., "Wi-Fi Backscatter: Internet Connectivity for RF-Powered Devices," Computer Science Bibliography, 607-618 (2014).
Fadelli et al., "Researchers realize a printed millimetre wave modulator and antenna array for backscatter communications," Science X Network, 2 pages, https://techxplore.com/news/2021-07-millimetre-wave-modulator-antenna-array-backscatter.html (2021).
5G/NR—Frame Structure, https://www.sharetechnote.com/html/5G/5G_FrameStructure.html.
Basic flow of a genetic algorithm, • https://subscription.packtpub.com/book/data/9781838557744/3/ch03lvl1sec12/basic-flow-of-a-genetic-algorithm.
Patwari, "Sparse Linear Antenna Arrays: A Review," IntechOpen, • https://www.intechopen.com/chapters/78401 (2021).

\* cited by examiner

SYSTEMS AND METHODS FOR SWITCHED ANTENNA ARRAY CONFIGURATION

BACKGROUND

Current radio communications systems rely on radio chains with Phased Array Antennas (PAA) to overcome the limited propagation of millimeter waves (mmWave) in object dense environments. PAA-based radio systems are generally inefficient and costly because full radio chains are required for each antenna element, with typical implementations having 512 elements or more. In implementations where the PAA system generally only communicates with radio systems at fixed locations, a large number of antennas of PAA are underutilized.

BRIEF DESCRIPTION OF THE DRAWINGS

Features and advantages of the disclosure will be apparent from the following description of embodiments and also as illustrated in the accompanying drawings, in which reference characters refer to the same parts throughout the various views. The drawings are not necessarily to scale, emphasis instead being placed upon illustrating principles of the disclosure.

DETAILED DESCRIPTION OF EXAMPLE EMBODIMENTS

In the various embodiments, a radio communication system implementing Switched Antenna Array (SAA) is provided that minimizes the number of radio chains required for a given number of antennas in an antenna array by implementing an radio frequency (RF) switch connecting the radio chains to the antennas. In some embodiments, the SAA can be a Software Defined SAA (SDSAA). In some embodiments, the RF switch can activate a subset of antennas in the antenna array to generate an appropriate beam pattern for communications with another device.

In some embodiments, the RF switch can be controlled by a switch controller that directs the RF switch to make the appropriate antenna-radio chain connections to activate specific antennas for a desired beam pattern. In some embodiments, the switch controller can provide the radio chains with the appropriate amplitude and phases for the signals to be transmitted through the active antennas to generate the desired beam pattern.

In the embodiments, a method can determine a radio chain-SAA configuration to generate a beamformed pattern that delivers a desired signal conformity level. In some embodiments, the configuration (represented by a configuration matrix) can comprise the antennas-radio chains connections and the corresponding phases or phase shifts and/or power levels or amplitudes for each antenna. In some embodiments, an initial configuration matrix can be requested and received from a server (e.g., a cloud server). In some embodiments, the initial configuration matrix is generated by the server. In some embodiments, the initial configuration matrix can be randomly generated. In some embodiments, the initial configuration matrix can be generated locally. In some embodiments, the initial configuration matrix can be provided to the switch controller to configure the RF switch. In some embodiments, the switch controller can also configure the power levels and phase shifts in the radio chains. In some embodiments, a signal conformity test can be performed based on the initial configuration matrix to determine a signal conformity level. In some embodiments, during the signal conformity test, one or more signal key performance indicators (KPI) can be determined. In some embodiments, the signal conformity level corresponds to one or more signal KPIs.

In some embodiments, a next configuration matrix can be requested and received from a server. In some embodiments, the next configuration matrix can be generated by the server. In some embodiments, the next configuration matrix can be generated locally. In some embodiments, the next configuration matrix can be a randomly generated configuration matrix. In some embodiments, the next configuration matrix can be generated by applying a genetic algorithm to the initial configuration matrix. In some embodiments, the next configuration matrix can be generated by propagating the initial configuration matrix and/or one or more signal KPIs through a Machine Learning algorithm.

In some embodiments, the next configuration matrix can be provided to the switch controller to reconfigure the RF switch and/or the radio chains. In some embodiments, the signal conformity test can be repeated. In some embodiments, the method can perform N number of mutations until a predetermined condition has been satisfied. In some embodiments, the condition can be a threshold or target signal conformity level. In some embodiments, the predetermined condition can be a signal KPI maxima. In some embodiments, the predetermined condition can be a signal KPI threshold. In some embodiments, the method can include mutating the random seed configuration matrix and repeating the process to mitigate local maxima.

In some embodiments, a radio system comprising an SAA as described herein can be reconfigured periodically to optimize the beam pattern or as a result of a change of position or operation of the radio system or another device. In some embodiments, the schedule for such reconfiguration can be weekly or monthly depending on how dynamic the environment is. In some embodiments, the radio system can be reconfigured based on a change of signal quality or some other KPI.

Various details regarding the aforementioned embodiments are described herein.

Figure 1:
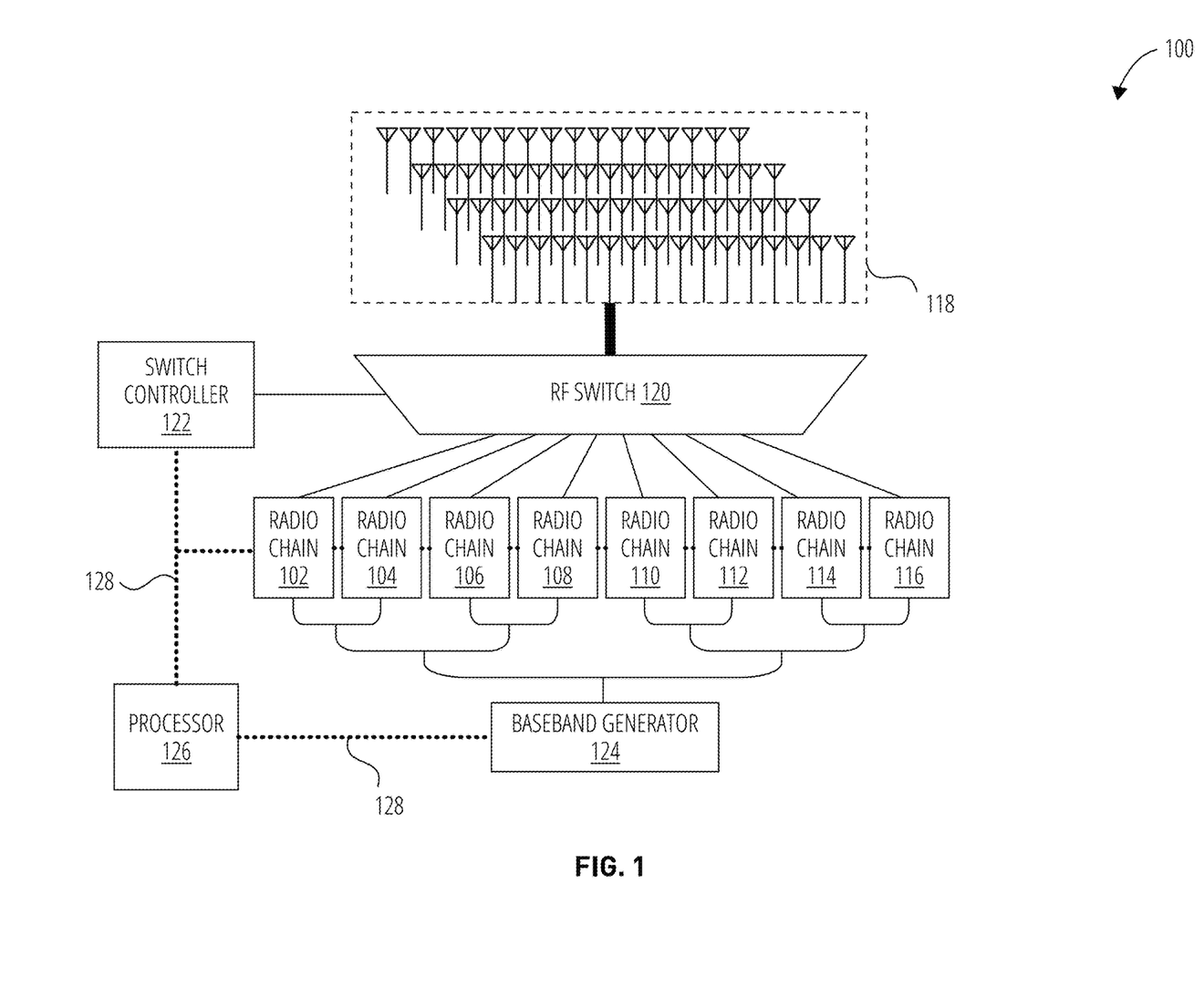
FIG. 1 is a block diagram illustrating a radio communication system including a Switched Antenna Array (SAA) according to some embodiments.

FIG. 1 is a block diagram illustrating a radio communication system 100 implementing an SAA according to some embodiments.

Figure 5:
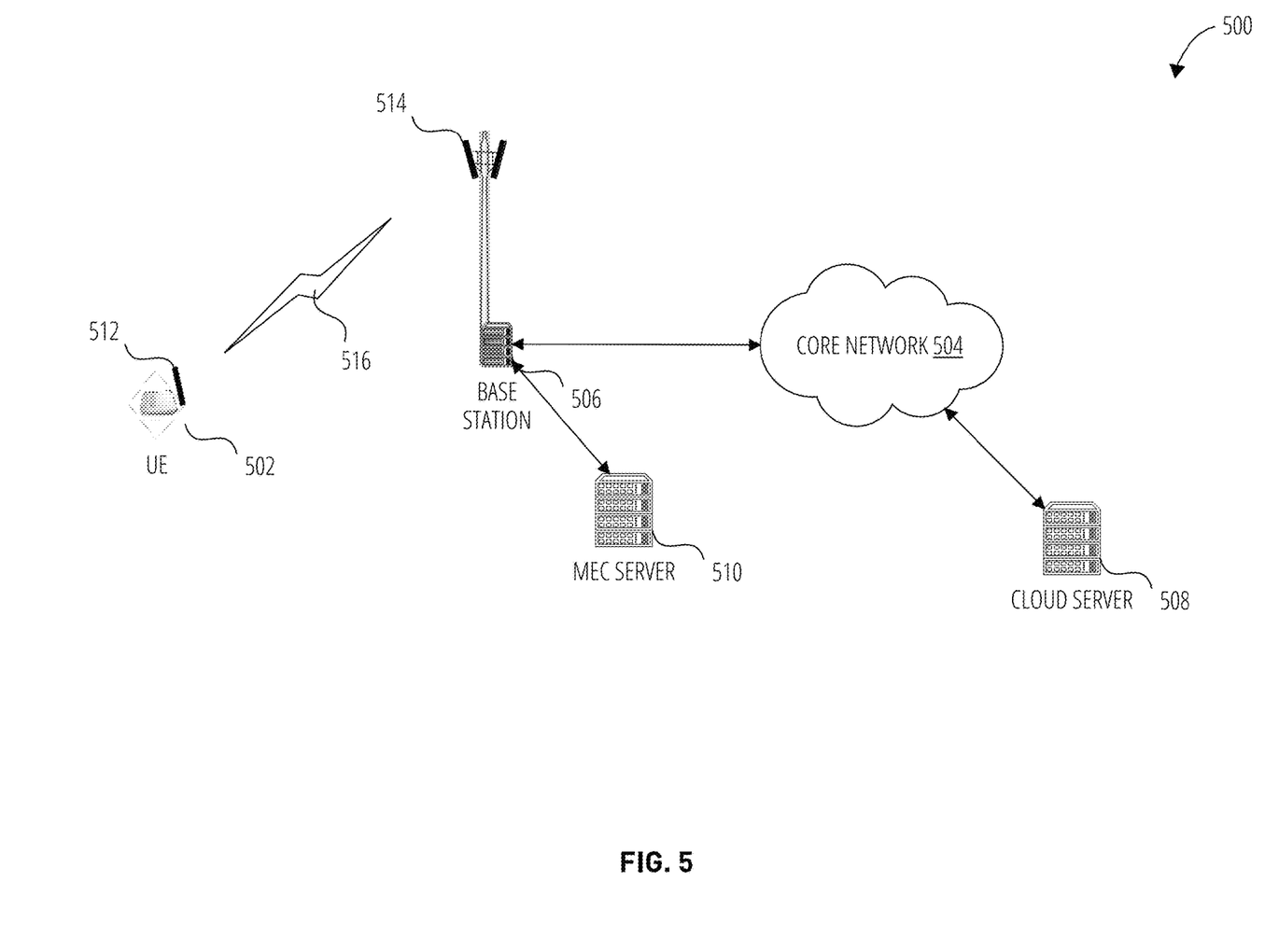
FIG. 5 is a block diagram of a communications network according to some embodiments.
Figure 7:
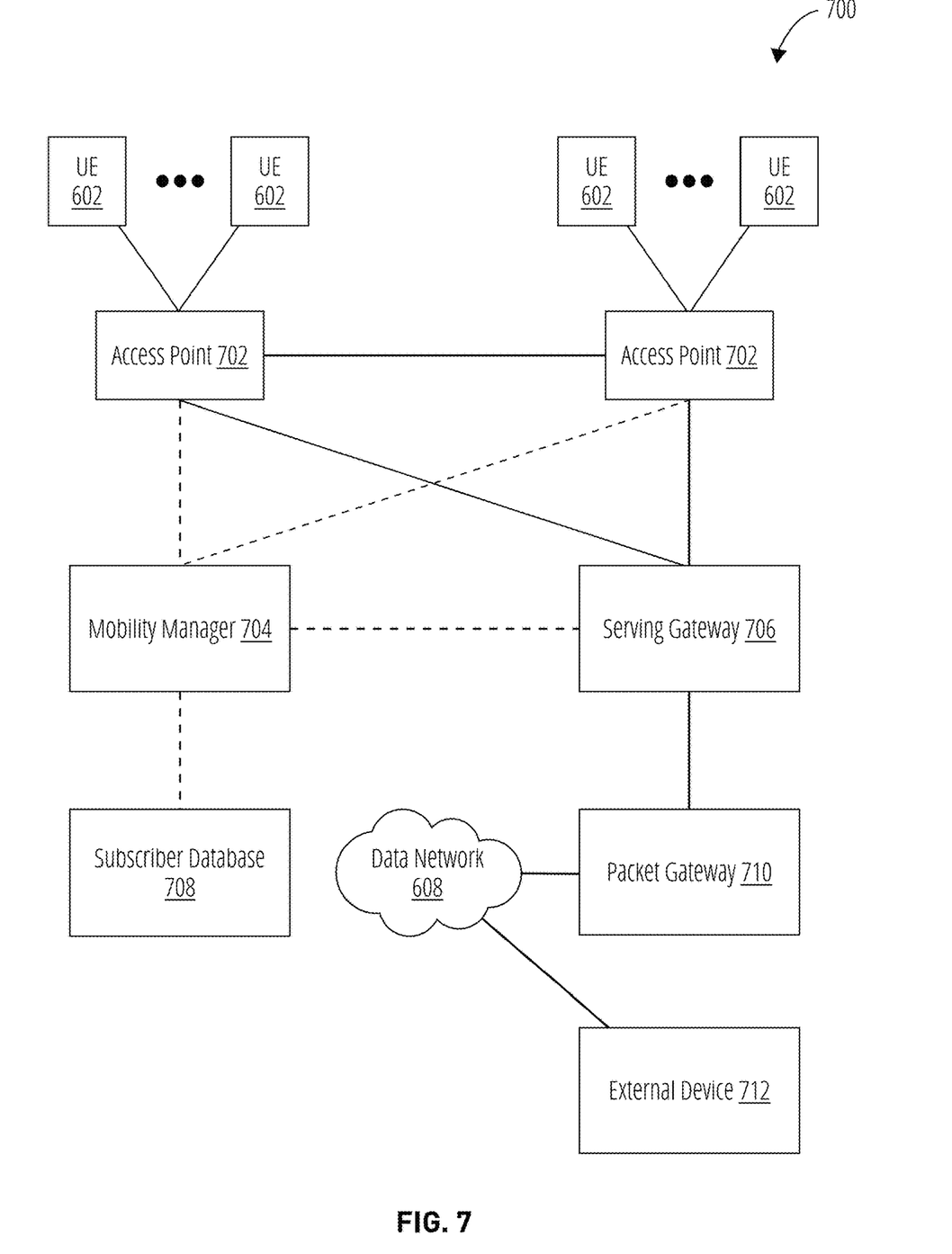
FIG. 7 illustrates an aspect of the subject matter according to some embodiments.

In an embodiment, system 100 may include more or fewer components than those shown in FIG. 1. In some embodiments, system 100 can be implemented on a user equipment (UE) or a base station (e.g., gNodeB (gNB), eNodeB (eNB))

of a radio access network (RAN) as discussed with respect to FIG. 5-FIG. 7. In some embodiments, system 100 can be implemented on a device such as device 800 discussed with respect to FIG. 8.

According to some embodiments, system 100 can perform directional radio transmission and reception using a beamformed antenna pattern created by connecting some or all antennas in an antenna array 118 with corresponding radio chains 102-116 using RF switch 120 and setting appropriate phase shifts and power levels at the radio chains.

In some embodiments, system 100 can include radio chains 102-116 connected to antenna array 118 through radio RF switch 120. In some embodiments, antenna array 118 can include a plurality of antennas. In some embodiments, the number of antennas in antenna array 118 is related to the number of radio chains and vice versa. In some embodiments, each radio chain 102-116 can be connected to each antenna of antenna array 118.

In some embodiments, radio chains 102-116 can be Tx radio chains, Rx radio chains, or both (e.g., a transceiver). In some embodiments, an Rx radio chain can include low noise amplifier, an analog to digital converter (ADC), and phase shifting elements. In some embodiments, a Tx radio chain can include phase shifting elements, a digital to analog (DAC) converter, and a power amplifier. In some embodiments, where a radio chain acts as a transceiver, the radio chain can include elements of both a Tx and Rx radio chains.

In some embodiments, radio chains 102-116 can be operatively connected to RF switch 120. In some embodiments, RF switch 120 can include any hardware and/or software components required to create an RF path between each of a plurality of radio chains and each of a plurality of antennas. In some embodiments, RF switch 120 can be a bidirectional RF multiplexor connecting radio chains to antennas. In some embodiments, RF switch 120 can be a crossbar switch as discussed with respect to FIG. 2.

In some embodiments, RF switch 120 can be controlled by a switch controller 122. In some embodiments, switch controller 122 can receive a configuration matrix including the antenna-radio chain connections. In some embodiments, the configuration matrix can include the phases or phase shifts and/or power levels or amplitudes for each antenna. In some embodiments, the switch controller 122 can receive the configuration matrix from a processor 126. In some embodiments, the switch controller 122 can send instructions or otherwise command the RF switch 120 to effect the connections between the antennas and radio chains. In some embodiments, the switch controller 122 can send instructions or otherwise command radio chains 102-116 to set the appropriate phase shift and power level for each antenna. In some embodiments, the switch controller 122 can send instructions or otherwise command baseband generator 124 to generate a baseband signal to be provided to the radio chains 102-116.

In some embodiments, radio chains 102-116, switch controller 122, baseband generator 124, and processor 126 can communicate with each other through bus 128. In some embodiments, processor 126 can send the configuration matrix to switch controller 122 to effect the appropriate antenna-radio chain connections. In some of those embodiments, processor 126 can direct baseband generator 124 to generate a baseband signal and can direct radio chains 102-116 to generate a signal with the appropriate phase shift and power level for each antenna based on the baseband signal. In some embodiments, processor 126 can provide the configuration matrix to the switch controller 122 and, in turn, switch controller 122 can communicate with radio chains 102-116, RF switch 120, and baseband generator 124 to generate a desired beam pattern.

In some embodiments, processor 126 can perform a signal conformity test using radio chains 102-116, RF switch 120, switch controller 122, and baseband generator 124. In some embodiments, a signal conformity test determines a conformity level of an RF connection or link between devices. In some embodiments, a signal conformity test determines a signal KPI. In some embodiments, processor 126 can be a processor or other hardware element capable of parallel processing. In some embodiments, processor 126 can be a graphical processor unit (GPU). In some embodiments, processor 126 can be a Field Programmable Gated Array (FPGA). In some embodiments, system 100 can be a networked system and processor 126 can communicate with other devices in a network to generate the configuration matrix in other devices in the network and receive the configuration matrix over the network.

Figure 2:
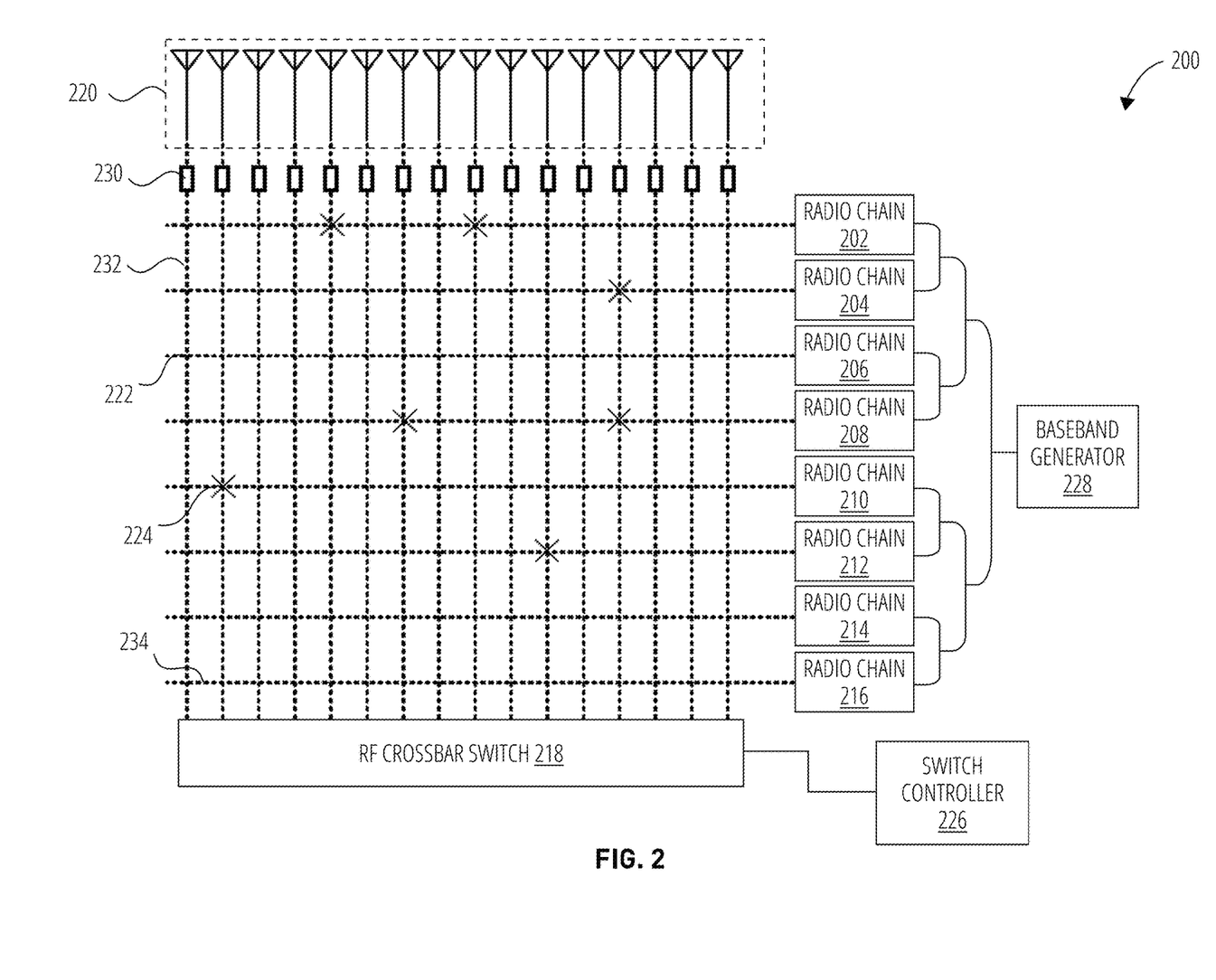
FIG. 2 is a block diagram illustrating a radio communication system including an SAA and crossbar switch according to some embodiments.

FIG. 2 is a block diagram illustrating a radio communication system including an SAA and a crossbar switch according to some embodiments.

According to some embodiments, system 200 is a simplified implementation of system 100 discussed with respect to FIG. 1. While FIG. 2 illustrates a ratio of antenna elements to radio chains of 2:1, it will be understood that embodiments described herein are applicable to any SAA system having any ratio of antennas to radio chains.

In some embodiments, system 200 can include radio chains 202-216 operatively connected to antenna array 220 through an RF crossbar switch 218. In some embodiments, crossbar switch 218 can connect each radio chain 202-216 to each antenna of antenna array 220. In some embodiments, crossbar switch 218 can include a plurality of cross-connect elements 222 to connect any given antenna-radio chain combination. In some embodiments, cross-connect elements 222 can be metal oxide semiconductor field-effect transistors (MOSFETs). However, cross-connect elements 222 can be any controllable component, known or to be known, capable of connecting a radio chain to an antenna without departing from the present disclosure. In some embodiments, crossbar switch 218 can include additional hardware (e.g., processors, FPGAs, transistors, and the like) to control cross-connect elements 222. In some embodiments, when cross-connect elements 222 are activated a connection 224 can be created between an antenna and a radio chain.

In some embodiments, radio chains 202-216 can be operatively connected to a baseband generator 228. In some embodiments, baseband generator 228 generates a baseband signal for the radio chains 202-216. In some embodiments, the radio chains 202-216 modulate or otherwise manipulate the baseband signal from baseband generator 228. In some embodiments, radio chains 202-216 can generate a signal based on the baseband signal where the generated signal and the baseband signal have different amplitudes or power level of the baseband signal. In some embodiments, radio chains 202-216 can generate a signal based on the baseband signal where the generated signal and the baseband signal have different phases.

In some embodiments, paths 232-234 can be microstrips forming the feed network to each antenna of antenna array 220. In some embodiments, as different antenna-radio chains connections are created and the number of active antennas vary, different radio chains may be presented with different impedances. In some of those embodiments, impedance matching can be achieved by using an impedance matching circuit 230. In some embodiments, each antenna of antenna array 220 can have a corresponding impedance matching circuit 230. In some embodiments, the impedance matching circuit 230 can comprise any circuit capable of matching the impedances of an antenna and a radio chain, and the disclosure is not limited to a specific type of impedance matching circuit. In some embodiments, in addition to or instead of circuit 230, paths 232-234 to each antenna can have specific geometries to achieve impedance matching.

In some embodiments, crossbar switch 218 can be connected to a switch controller 226. In some embodiments, the switch controller 226 can indicate to the crossbar switch 218 the antenna-radio chain connections to be effected for a particular beam pattern. In some embodiments, the switch controller 226 can provide crossbar switch 218 a configuration matrix indicating the specific cross-connect elements 222 to activate. In some embodiments, switch controller 226 can be connected to radio chains 202-216. In some embodiments, switch controller 226 can indicate a phase shift and/or power level to one of radio chains 202-216 for a given antenna-radio chain pairing.

Figure 3:
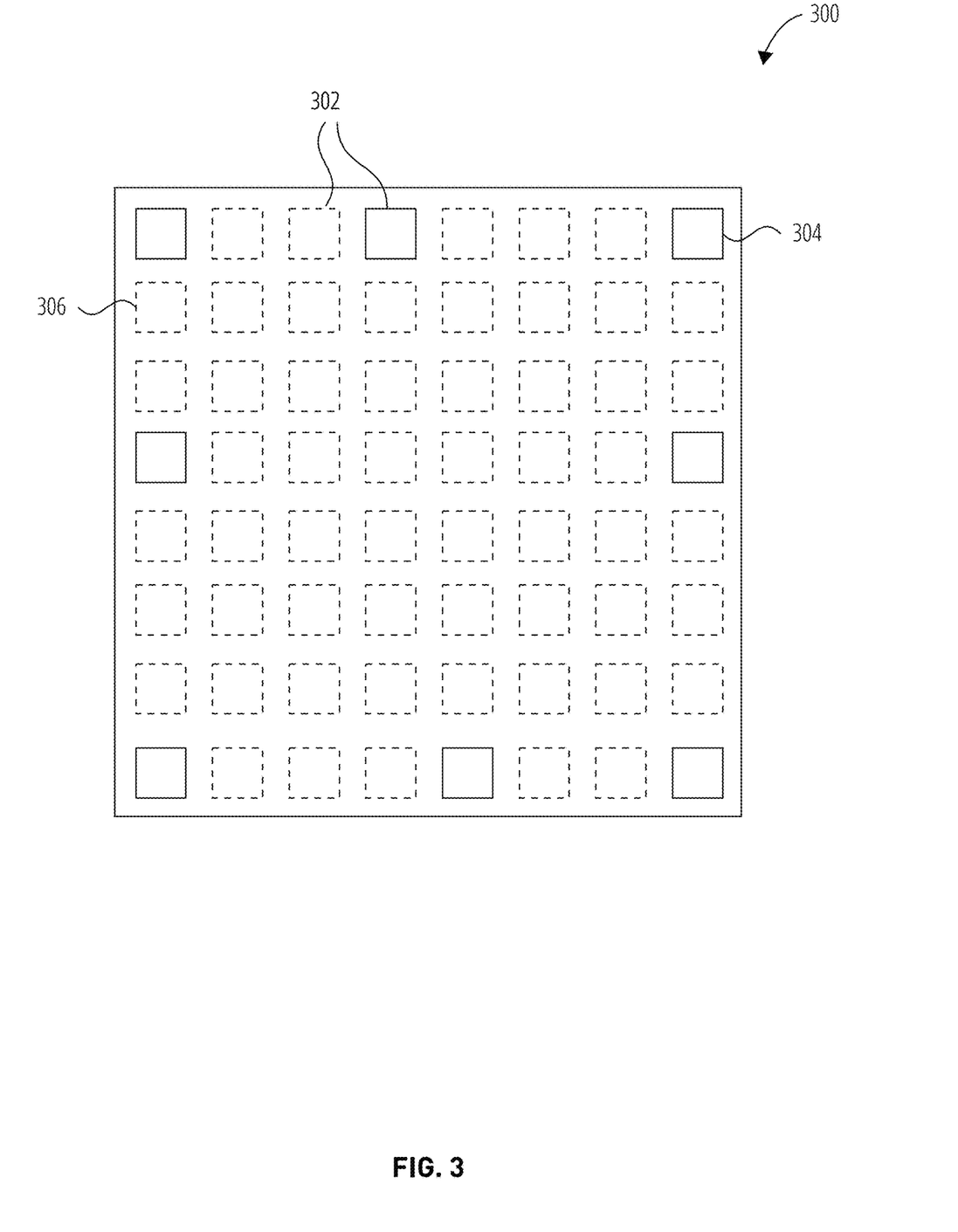
FIG. 3 is a block diagram illustrating an SAA according to some embodiments.

FIG. 3 is a block diagram illustrating an SAA configuration according to some embodiments.

In some embodiments, SAA 300 can comprise a plurality of radiators 302 (e.g., antennas). In some embodiments, radiators 302 can be microstrip antennas. In some embodiments, some or all radiators 302 can comprise unique patch geometries different from the patch geometry of other radiators 302. In some embodiments, radiators 302 can comprise any patch geometry capable of supporting high Tx/Rx performance for multiple center-frequencies and bandwidths.

In some embodiments, depending on the configuration applied to the SAA 300, SAA 300 can comprise electrically active radiators 304 and electrically inert radiators 306 (e.g., disabled). In some embodiments, some or all radiators 302 can be active radiators. In some embodiments, radiators 302 can be activated by connecting the radiators 302 to a radio chain using an RF switch as discussed herein.

In some embodiments, radiators 302 can be arranged in a grid pattern as illustrated in FIG. 3. In those embodiments, SAA 300 can maintain the orthogonality, as well as radiator size and polarization, of a PAA of similar size and antenna pattern while providing more control over the antenna configuration and other factors (e.g., gain). In some embodiments, SAA 300 can have increased power savings over a similar sized PAA since less power is wasted on radiators that are not contributing to the performance of the array. In some embodiments, radiators 302 can be arranged in any pattern suitable for achieving a desired beam pattern as well as high Tx/Rx performance for multiple center-frequencies and bandwidths.

In some embodiments, which radiators 302 are to be activated for a particular beam pattern can be determined using a plurality of techniques known or to be known. In some embodiments, the active radiators can be determined using a Minimum Redundancy Array (MRA) method. In some embodiments, the active radiators can be determined using a Minimum Hole Array (MHA) method. In some embodiments, the active radiators can be determined using a Nested Array method. In some embodiments, the active radiators can be determined using a Co-Prime Array method.

Figure 4:
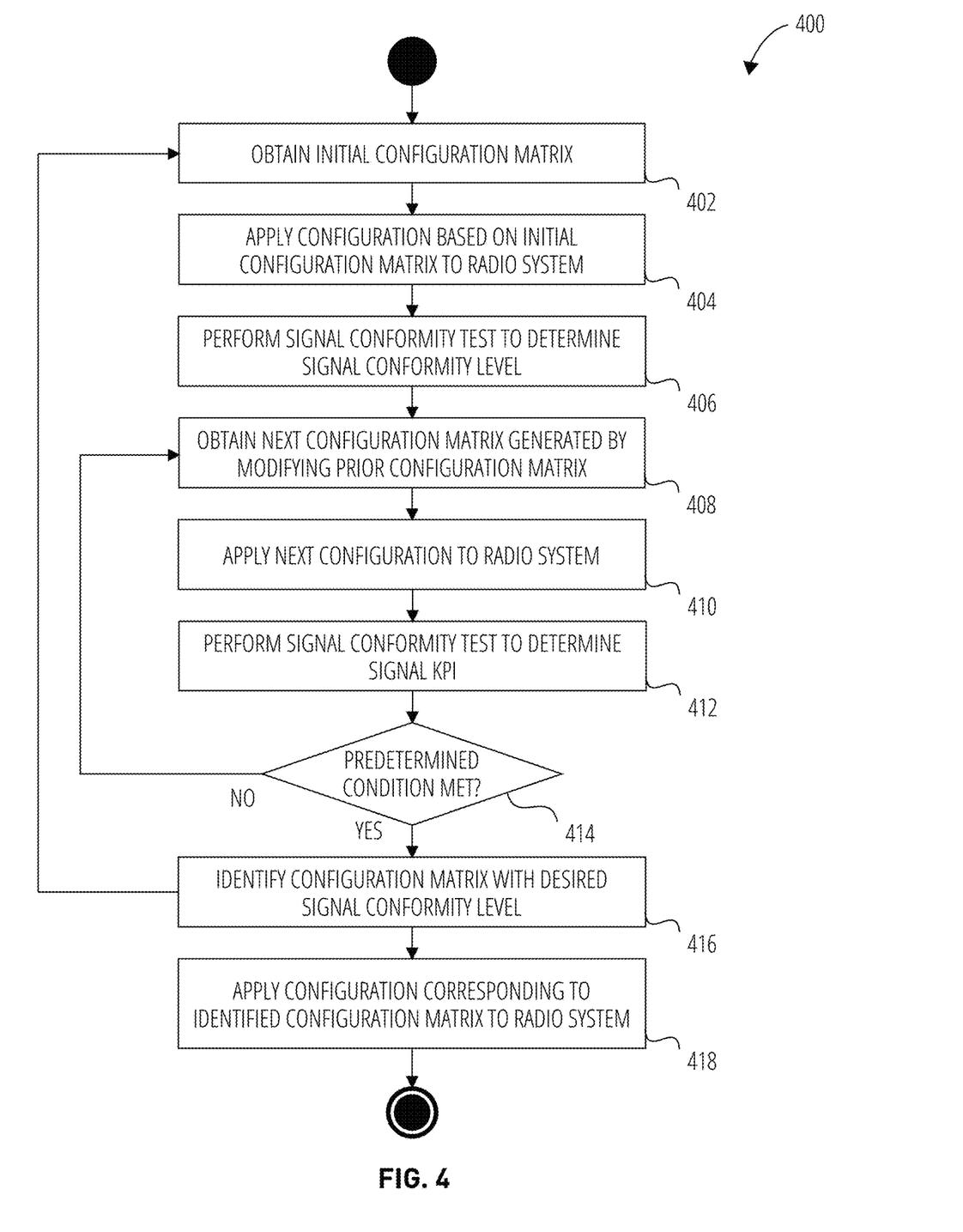
FIG. 4 illustrates an aspect of the subject matter in accordance with one embodiment.

FIG. 4 is a flow diagram illustrating a method for identifying a configuration for a radio communications system according to some embodiments.

According to some embodiments, method 400 determines the best configuration for a radio communications system (e.g., system 200 as discussed with respect to FIG. 2) comprising an SAA, crossbar switch, and radio chains.

In Step 402, method 400 obtains an initial configuration matrix, which can include transmitting a request to provide an initial configuration matrix and receiving the initial configuration matrix, or the initial configuration matrix can just be sent or pushed without a request or otherwise obtained, received or pre-stored. In some embodiments, an initial configuration matrix can include the specific antennas to be activated in an SAA, and, for each antenna, the phase (or phase shift) and/or amplitude (or power level) for signals to be transmitted over said antenna. In some embodiments, the initial configuration matrix can be referred to as a seed configuration matrix. In some embodiments, the seed configuration matrix can be generated by randomizing the selected antennas, phase values, and amplitude values—a random seed configuration matrix.

In some embodiments, the initial configuration matrix can be selected from a known set of configuration matrixes. In some embodiments, the known set of configuration matrixes can comprise configuration matrixes corresponding to known devices and/or the location of known specific devices with respect to the radio system.

As discussed herein, in some embodiments, the radio system can be part of a network (e.g., a base station of a RAN connected to a core network and/or mobile edge computing (MEC) systems). In those embodiments, in Step 402, the radio system can retrieve the initial configuration matrix from a database stored in another device over the network. In some embodiments, the initial configuration matrix and any other computing related to the configuration matrixes can be performed in another device (e.g., a server) and received at the radio communications system over the network (e.g., cloud computing). In some embodiments, all configuration matrixes generated in method 400 can be stored in the database or in a local database of the radio system.

In Step 404, method 400 can include applying an initial configuration to the radio system based on the initial configuration matrix. In some embodiments, applying a configuration to the radio system can comprise directing the crossbar switch and radio chains of the radio system to perform an action. In some embodiments, a configuration matrix can be used to direct the crossbar switch to effect the appropriate antenna-radio chain connections and direct the radio chains to generate radio signals to be transmitted over specific antennas with the appropriate phase shifts and amplitudes for the specific antenna.

In Step 406, method 400 can include performing a signal conformity test to determine a signal conformity level corresponding to the initial configuration based on the initial configuration matrix. In some embodiments, a signal conformity test can include transmitting a test signal and determining a performance characteristic of the signal—a signal KPI. In some embodiments, a signal KPI can be Reference Signal Received Power (RSRP). In some embodiments, a signal KPI can be Orthogonal Frequency Division Multiplexing (OFDM) vector errors. In some embodiments, a signal KPI can be a Bit Error Rate (BER). In some embodiments, a signal conformity level can be a Call Quality Indicator (CQI). In some embodiments, a signal conformity level can be a combination of signal KPIs.

In Step 408, method 400 obtains a next configuration matrix, which can include transmitting a request to provide a next configuration matrix and receiving the next configuration matrix, or the next configuration matrix can just be sent or pushed without a request or otherwise obtained, received or pre-stored. In some embodiments, the next configuration matrix can be generated by modifying or mutating the initial configuration matrix (or prior configuration matrix in successive iterations). In some embodiments, the next configuration matrix, can be generated by applying a genetic algorithm to the initial configuration matrix (or prior configuration matrix). In some embodiments, next configuration matrix can be determined by propagating the initial configuration matrix (or prior configuration matrix in successive iterations) through a machine learning model. In some embodiments, the next configuration matrix can be selected from a known set of configuration matrixes. In some embodiments, the known set of configuration matrixes can comprise configuration matrixes corresponding to known devices and/or the location of known specific devices with respect to the radio system.

In Step 410, method 400 can include applying a next configuration based on the next configuration matrix to the crossbar switch and radio chains of the radio communications system.

In Step 412, method 400 can include performing a signal conformity test to determine the signal conformity level corresponding to the next configuration.

In Step 414, method 400 can include determining if a predetermined condition has been met. In some embodiments, the predetermined condition can include a threshold or target signal conformity level or signal KPI. In some embodiments, the predetermined condition can include a signal KPI maxima. In some embodiments, the predetermined condition can be a signal KPI threshold. In some embodiments, the predetermined condition can be a number of N iterations of Steps 408-412.

In some embodiments, in Step 414, if the predetermined condition has been satisfied, method 400 proceeds to Step 416. In some embodiments, if the predetermined condition has not been satisfied, method 400 repeats Steps 408-410 until the predetermined condition has been satisfied.

In Step 416, method 400 can include identifying, from all the configuration matrixes generated, a final configuration matrix. In some embodiments, the final configuration matrix corresponds to the beam pattern that provides a signal conformity level meeting a signal conformity level threshold. In some embodiments, the final configuration matrix can be the configuration matrix with a highest given KPI from a plurality of KPIs.

In Step 418, method 400 can include applying a final configuration based on the final configuration matrix to the crossbar switch and radio chains of the radio system.

In some embodiments, to mitigate local maxima, method 400 can further include repeating Steps 402-416. In those embodiments, method 400 can include transmitting a request for an M initial configuration matrix generated by modifying or mutating the initial configuration matrix (or an M−1 initial configuration matrix in successive iterations). In some embodiments, the M initial configuration matrix can be generated by applying a genetic algorithm to the initial configuration matrix (or M−1 initial configuration matrix).

FIG. 5 is a block diagram of a communications network according to some embodiments.

According to some embodiments, one or more UE 502 are communicatively coupled to a core network 504 via a base station 506 of a radio access network (RAN). No limit is placed on the type of UE in the network 500. For example, in some embodiments, UE 502 can be Ultra-Reliable Low Latency Communications (URLLC) devices such as autonomous vehicle computing devices, IoT devices, remote surgery devices, etc. In some embodiments, UE 502 can be enhanced mobile broadband (eMBB) devices such as smartphones, tablets, etc. In some embodiments, UE 502 can be Massive Machine-Type Communications (mMTC) devices such as sensors, meters, and monitoring devices. In some embodiments, UE 502 can be Customer Premise Equipment (CPE) devices.

In one embodiment, base station 506 can be one of a plurality of base stations on the RAN. In some embodiments, base station 506 can be a 4G base station, such as an eNodeB base stations. In some embodiments, base station 506 can be a 5G base stations, such as a gNodeB base stations. In some embodiments, a single physical location can have both an eNodeB base station and a gNodeB base station. In one embodiment, a given UE can connect to a 4G base station or a 5G base station. In some embodiments, a given UE can connect to both a 4G base station and a 5G base station in a dual connectivity setup. In such a setup, the UE may use the 4G base station for control plane traffic, while the UE can use the 5G base station for user plane traffic.

In some embodiments, the base station 506 can be communicatively coupled to the core network 504. In one embodiment, the core network 504 can comprise a homogenous network. For example, the core network 504 can comprise an LTE core network. Alternatively, the core network 504 can comprise a 5G core network. In one embodiment, the core network 504 can comprise two networks, such as an LTE core network and a 5G core network.

In some embodiments, UE 502 and base station 506 can be communicatively coupled to a cloud server 508 via the core network 504. In some embodiments, the cloud server 508 can provide computing resources to the UE 502 and base station 506 to generate configuration matrixes as discussed herein. In some embodiments, UE 502 and base station 506 can be communicatively coupled to an MEC Server 510. In some embodiments, the MEC Server 510 can provide computing resources to generate configuration matrixes as discussed herein.

According to some embodiments, UE 502 and base station 506 can be communicatively coupled over an air interface comprising a radio frequency communications link 516. In some embodiments, UE 502 can comprise a radio communication system (e.g., system 100 or system 200) including an SAA as discussed herein while base station 506 can comprise a PAA. In some embodiments, UE 502 and base station 506 can each comprise a radio communication system (e.g., system 100 or system 200) including an SAA. In these embodiments, the use of an SAA can reduce the cost of the UE and/or the base station, increase efficiency, keep power consumption low, and reduce the need for additional cooling (e.g., fans). Further, in these embodiments, the use of an SAA can allow for reduced discontinuous reception (DRX) cycling. In some embodiments, UE 502 and base station 506 can comprise antenna arrays 512 and 514, respectively. In some embodiments, antenna array 512 and antenna array 514 can be an SAA.

In some embodiments, UE 502 and base station 506 can be positionally fixed with respect to each other. In those embodiments, one of UE 502 and base station 506 can comprise an SAA while the other comprises a PAA. In some of those embodiments, a configuration matrix corresponding to the beamformed pattern that delivers the desired signal conformity level between UE 502 and 506 can be determined by method 400 as discussed in relation to FIG. 4. Then, the configuration matrix can be applied to the radio communications system with the SAA. In some embodiments, the configuration may not have to be recalculated unless the positional relation changes.

In some embodiments, the positional relation of UE 502 and base station 506 can change periodically. In those embodiments, one or both devices can determine a new configuration matrix corresponding to beamformed pattern that delivers a desired signal conformity level for the new positional relationship. In some embodiments, this process can be referred to as reconvergence. In some embodiments, during reconvergence, the UE 502 can connect to another base station to maintain communications with the core network 504, cloud server 508, MEC Server 510, or a data network.

According to some embodiments, UE 502 can be one of a plurality of UEs connected to base station 506. In some embodiments, base station 506 can maintain a local database containing configuration matrixes corresponding to each of the UEs. In some embodiments, UE 502 can maintain a local database of configuration matrixes each corresponding to a different base station 506. In some embodiments, UE 502 and base station 506 can receive configuration matrixes generated by cloud server 508 or from a database stored on cloud server 508. In some embodiments, all configuration matrixes are generated on cloud server 508 and transmitted UE 502 and cloud server 508.

Figure 6:
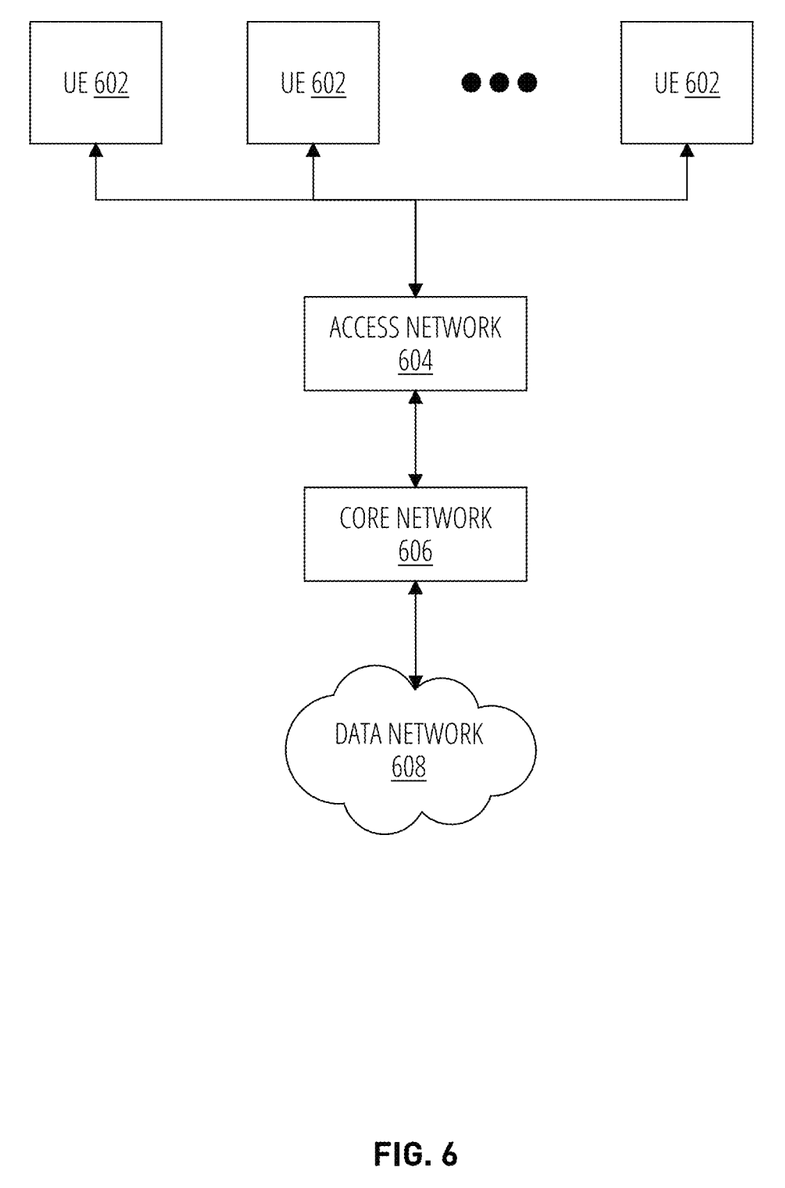
FIG. 6 is a block diagram of a cellular network according to some embodiments.

FIG. 6 is a block diagram of an example network architecture according to some embodiments of the present disclosure.

In the illustrated embodiment, user equipment ("UE") 602 can access a data network 608 via an access network 604 and a core network 606. In the illustrated embodiment, UE 602 can comprise any computing device capable of communicating with the access network 604 (e.g., device 800 discussed in relation to FIG. 8). As examples, UE 602 can include mobile phones, smart devices, tablets, laptops, sensors, IoT devices, autonomous machines, unmanned aerial vehicles (UAVs), wired devices, wireless handsets, and any other devices equipped with a cellular or wireless or wired transceiver. In some embodiments, UE 602 can include a 5G CPE.

In the illustrated embodiment of FIG. 6, the access network 604 can comprise a network allowing network communication with UE 602. In general, the access network 604 can include at least one base station that is communicatively coupled to the core network 606 and coupled to zero or more UE 602.

In some embodiments, the access network 604 can comprise a cellular access network, for example, a fifth-generation (5G) network or a fourth-generation (4G) network. In one embodiment, the access network 604 can comprise a NextGen Radio Access Network (NG-RAN), which can be communicatively coupled to UE 602. In an embodiment, the access network 604 can include a plurality of base stations (e.g., eNodeB (eNB), gNodeB (gNB)) communicatively connected to UE 602 via an air interface. In one embodiment, the air interface can comprise a New Radio (NR) air interface. For example, in a 5G network, UE 602 can be communicatively coupled to each other, and in some embodiments, for example, such coupling can be via Wi-Fi functionality, Bluetooth, or other forms of spectrum technologies, and the like.

In the illustrated embodiment, the access network 604 can provide the UE 602 access to a core network 606. In the illustrated embodiment, the core network may be owned and/or operated by a network operator (NO) and provides wireless connectivity to UE 602 via access network 604. In the illustrated embodiment, this connectivity may comprise voice and data services.

At a high-level, the core network 606 may include a user plane and a control plane. In one embodiment, the control plane comprises network elements and communications interfaces to allow for the management of user connections and sessions. By contrast, the user plane may comprise network elements and communications interfaces to transmit user data from UE 602 to elements of the core network 606 and to external network-attached elements in a data network 608 such as, but not limited to, the Internet, a local area network (LAN), a wireless LAN, a wide area network (WAN), a mobile edge computing (MEC) network, a private network, a cellular network, and the like. In some embodiments, network elements may be physical elements such as router, servers and switches or may be virtual network functions implemented on physical elements.

In the illustrated embodiment, the access network 604 and the core network 606 may be operated by a NO. However, in some embodiments, the networks (604, 606) may be operated by a private entity, different entities, and the like, and may be closed to public traffic. In these embodiments, the operator of the device can simulate a cellular network, and UE 602 can connect to this network similar to connecting to a national or regional network.

FIG. 7 is a block diagram illustrating a cellular network according to some embodiments of the present disclosure.

In the illustrated embodiment, a system 700 can include UE 602 communicatively connected to access points 702. As seen in FIG. 7, the access points 702 form an access network such as access network 604. In one embodiment, the access points 702 and UE 602 comprise a NextGen Radio Access Network (NG-RAN). In an embodiment, access points 702 comprise a plurality of gNodeB base stations connected to UE 602 via an air interface. In one embodiment, the air interface comprises a New Radio (NR) air interface. In some embodiments, the gNodeB can include multiple network interfaces for communicating with the core network and, specifically, Mobility Manager 704 and Serving Gateway 706. In one embodiment, the Mobility Manager 704 in a 5G network comprises an Access and Mobility Management Function (AMF). In one embodiment, the Serving Gateway 706 comprises an Session Management Function (SMF) for control data or User Plane Function (UPF) for user data.

In another embodiment, access points 702 can comprise eNodeB base stations connected to UE 602 via an air interface. In some embodiments, the air interface comprises an E-UTRAN Uu or LTE Uu radio air interface. In these embodiments, the eNodeB can provide all functionality to implement and operate the air interface and negotiates uplinks and downlinks with the UE 602. In some embodiments, the eNodeB can also include multiple network interfaces for communicating with the core network and, specifically, Mobility Manager 704 and Serving Gateway 706. In one embodiment, the Mobility Manager 704 can comprise a Mobile Management Entity (MME) in a 4G network. In the illustrated embodiment, solid lines between network elements 704, 706, 708, 710 represent user data traffic, while dashed lines between network elements 704, 706, 708, 710 represent control or Non-Access Stratum (NAS) traffic.

In the illustrated embodiment, the Mobility Manager 704 manages control plane traffic while the gateway elements 706, 710 manage user data traffic. Specifically, the Mobility Manager 704 may comprise hardware or software for handling network attachment requests from UE 602. As part of processing these requests, the Mobility Manager 704 accesses a Subscriber Database 708. The Subscriber Database 708 comprises hardware or software that stores user authorization and authentication data and validates users to the network. In some embodiments, the Subscriber Database 708 may comprise a Unified Data Management (UDM) and Unified Data Repository (UDR) in a 5G network. In another embodiment, the Subscriber Database 708 may comprise an Home Subscriber Server (HSS) in a 4G network. In one embodiment, the Subscriber Database 708 may also store a location of the user updated via a Diameter or similar protocol.

The Mobility Manager 704 may also be configured to create data sessions or bearers between UE 602 and Serving Gateway 706 or gateway 710. In one embodiment, the Serving Gateway 706 and gateway 710 may comprise single or separate devices. In general, the Serving Gateway 706 routes and forwards user data packets while also acting as the mobility anchor for the user plane during access point handovers and as the anchor for mobility between different network technologies. For idle state UE 602, the Serving Gateway 706 terminates the downlink data path and triggers paging when downlink data arrives for the UE 602. The Serving Gateway 706 manages and stores UE 602 contexts, e.g., parameters of the IP bearer service, network internal routing information. In a 5G network, the Serving Gateway 706 may be implemented by an SMF. In a 4G network, the Serving Gateway 706 may be implemented by an S-GW.

The Serving Gateway 706 is communicatively coupled to a gateway 710. In general, the gateway 710 provides connectivity from the UE 602 to external Packet Data Networks (PDNs) such as data network 608 by being the point of exit and entry of traffic to external networks (e.g., 608). UE 602 may have simultaneous connectivity with plurality gateways, including gateway 710 for accessing multiple packet data networks. The gateway 710 performs policy enforcement, packet filtering for each user, charging support, lawful interception, and packet screening. In the illustrated embodiment, gateway 710 also limits access to endpoints such as an External Device 712. In a 5G network, the gateway 710 may be implemented by a UPF. In a 4G network, the gateway 710 may be implemented by a P-GW.

In the illustrated embodiment, an External Device 712 is communicatively coupled to the core network via the data network 608. In one embodiment, the data network 608 may comprise the Internet. In the illustrated embodiment, the External Device 712, such as an application server, may comprise any electronic device capable of communicating with the data network 608, and the disclosure is not limited to specific types of network devices.

Figure 8:
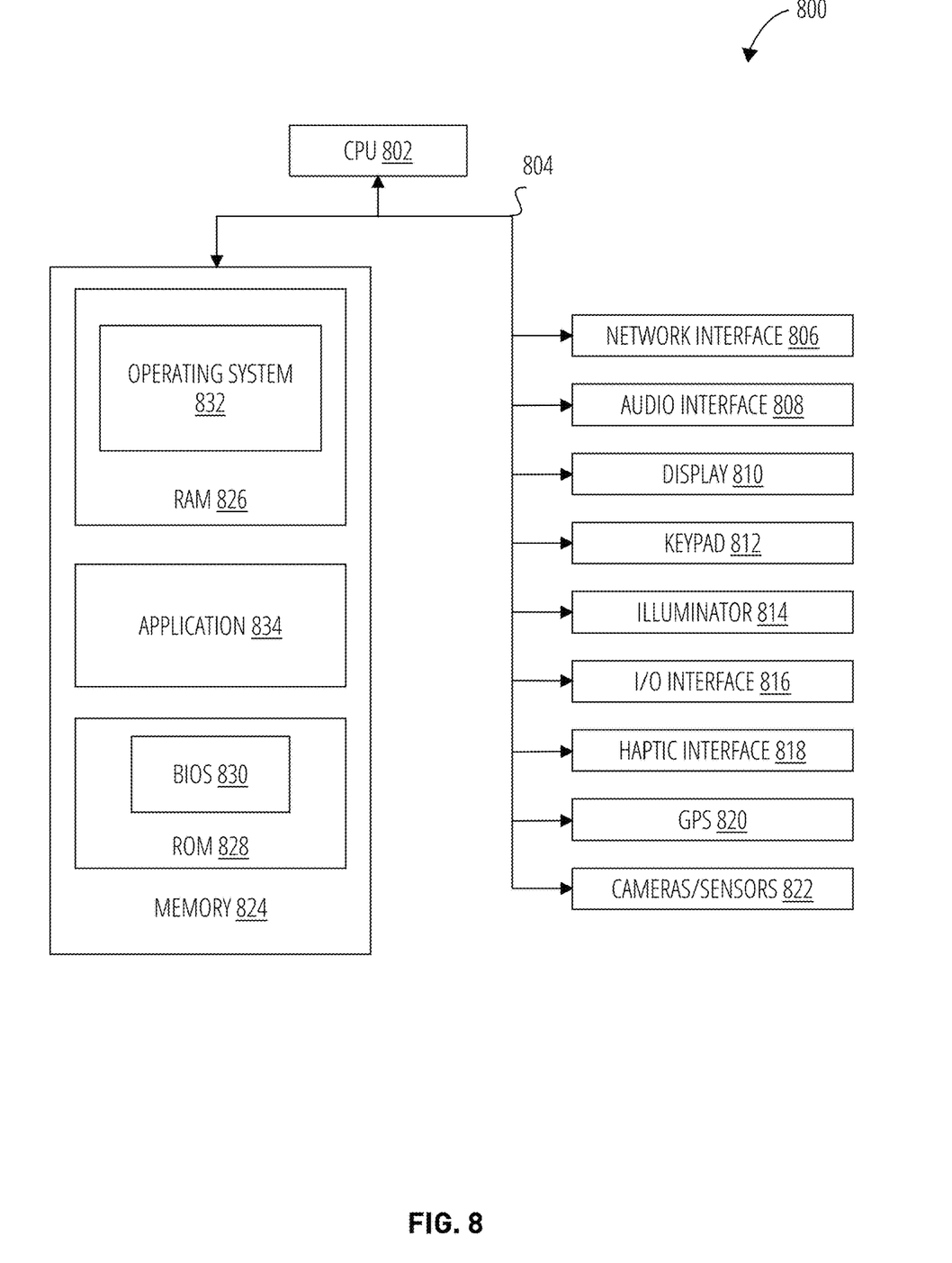
FIG. 8 is a block diagram illustrating an example of a device used in various embodiments of the present disclosure.

FIG. 8 is a schematic diagram illustrating an example embodiment of a device 800 (e.g., a client device or server device) that may be used in the various embodiments of the present disclosure.

Device 800 may include more or fewer components than those shown in FIG. 8. However, the components shown are sufficient to disclose an illustrative embodiment for implementing the present disclosure. Device 800 can be a representation of UE 602 as mentioned above.

As shown in the figure, device 800 includes a processing unit (CPU) 802 in communication with a mass memory 824 via a bus 804. Device 800 also includes one or more network interface 806, an audio interface 808, a display 810, a keypad 812, an illuminator 814, an input/output (I/O) interface 816, a haptic interface 818, an optional global positioning systems (GPS) receiver 820, and one or more cameras or other optical, thermal or electromagnetic sensor 822.

Device 800 may optionally communicate with a base station (not shown), or directly with another computing device. Network interface 806 is sometimes known as a transceiver, transceiving device, or network interface card (NIC).

Mass memory 824 illustrates a non-limiting example of computer storage media for storage of information such as computer readable instructions, data structures, program modules or other data. Mass memory 824 can include random access memory (RAM) 826, read-only memory (ROM) 828, or any other type of memory known or to be known. Mass memory 824 can store a basic input/output system (BIOS) 830 for controlling low-level operation of device 800. The mass memory 824 can also store an operating system 832 for controlling the operation of device 800.

Applications 834 may include computer-executable instructions which, when executed by device 800, transmit, receive, and/or otherwise process audio, video, images, and enable telecommunication with a server and/or another user of another client device.

Device 800 may be referred to as a computing device or a client device, interchangeably. A computing device may be capable of sending or receiving signals, such as via a wired or wireless network, or may be capable of processing or storing signals, such as in memory as physical memory states. A client device may, include a portable and non-portable devices including without limitation, cellphones, tablets, wearables, and integrated or distributed devices combining various features, such as features of the forgoing devices, or the like. In some embodiments, device 800 may operate as a server that can provide processing, database, and communication facilities. In some embodiments, a server may be embodied in a single, physical processor with associated communications and data storage facilities, or it may be a networked or clustered complex of processors and associated network and storage devices (e.g., cloud servers).

Throughout the specification and claims, terms may have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   obtaining a configuration matrix representing a configuration of a radio system;
   determining a signal conformity level corresponding to the configuration matrix by configuring the radio system based on the configuration matrix and performing a signal conformity test;
   repeating these steps until the signal conformity level meets a predetermined signal conformity level threshold;
   identifying the configuration matrix having the signal conformity level that meets the predetermined signal conformity level threshold; and
   configuring the radio system with the identified configuration matrix.

2. The method of claim 1, wherein the radio system comprises a plurality of radio chains and a plurality of antennas connected to a switch, and wherein the switch is capable of connecting any of the plurality of radio chains to any of the plurality antennas based on the configuration matrix.

3. The method of claim 2, wherein the configuration matrix indicates one or more antenna-radio chain connections and a phase shift and amplitude for each antenna in an antenna-radio chain connection.

4. The method of claim 2, wherein each antenna in a subset of the plurality of antennas comprises a unique patch geometry.

5. The method of claim 1, wherein the signal conformity level comprises a signal Key Performance Indicator (KPI).

6. The method of claim 1, wherein the radio system is a radio system of a base station and the base station is communicatively coupled to a cloud server through a core network, and wherein the configuration matrix is obtained from the cloud server.

7. The method of claim 1, wherein the radio system is a radio system of a base station communicatively connected to a plurality of User Equipment (UE), and wherein the identified configuration matrix is specific to one of the plurality of UEs.

8. A non-transitory computer-readable storage medium for storing instructions executable by a processor, the instructions comprising:
   obtaining a configuration matrix representing a configuration of a radio system;

determining a signal conformity level corresponding to the configuration matrix by configuring the radio system based on the configuration matrix and performing a signal conformity test;

repeating these steps until the signal conformity level meets a predetermined threshold;

identifying the configuration matrix having the signal conformity level that meets the predetermined threshold; and configuring the radio system with the identified configuration matrix.

9. The computer-readable medium of claim 8, wherein the radio system comprises a plurality of radio chains and a plurality of antennas connected to a switch, and wherein the switch is capable of connecting any of the plurality of radio chains to any of the plurality of antennas based on the configuration matrix.

10. The computer-readable medium of claim 9, wherein the configuration matrix indicates one or more antenna-radio chain connections and a phase shift and amplitude for each antenna in an antenna-radio chain connection.

11. The computer-readable medium of claim 9, wherein each antenna in a subset of the plurality of antennas comprises a unique patch geometry.

12. The computer-readable medium of claim 8, wherein the signal conformity level comprises a signal Key Performance Indicator (KPI).

13. The computer-readable medium of claim 8, wherein the radio system is a radio system of a base station and the base station is communicatively coupled to a cloud server through a core network, and wherein the configuration matrix is obtained from the cloud server.

14. The computer-readable medium of claim 8, wherein the radio system is a radio system of a base station communicatively connected to a plurality of User Equipment (UE), and wherein the identified configuration matrix is specific to one of the plurality of UEs.

15. A device comprising a processor configured to:

obtain a configuration matrix representing a configuration of a radio system;

determine a signal conformity level corresponding to the configuration matrix by configuring the radio system based on the configuration matrix and performing a signal conformity test;

repeat these steps until the signal conformity level meets a predetermined threshold;

identify the configuration matrix having the signal conformity level that meets the predetermined threshold; and configure the radio system with the identified configuration matrix.

16. The device of claim 15, wherein the radio system comprises a plurality of radio chains and a plurality of antennas connected to a switch, and wherein the switch is capable of connecting any of the plurality of radio chains to any of the plurality of antennas based on the configuration matrix.

17. The device of claim 16, wherein the configuration matrix indicates one or more antenna-radio chain connections and a phase shift and amplitude for each antenna in an antenna-radio chain connection.

18. The device of claim 16, wherein each antenna in a subset of the plurality of antennas comprises a unique patch geometry.

19. The device of claim 15, wherein the signal conformity level comprises a signal Key Performance Indicator (KPI).

20. The device of claim 15, wherein the device is communicatively coupled to a cloud server through a core network, and wherein the processor is further configured to obtain the configuration matrix from the cloud server.

* * * * *